March 18, 1930.

J. LEDWINKA

Re. 17,623

DOOR FOR AUTOMOBILE BODIES

Original Filed Jan. 12, 1926

3 Sheets-Sheet 1

INVENTOR.
JOSEPH LEDWINKA
BY J. Wm. P. Jackson
ATTORNEY.

March 18, 1930.

J. LEDWINKA

DOOR FOR AUTOMOBILE BODIES

Original Filed Jan. 12, 1926

Re. 17,623

3 Sheets-Sheet 2

INVENTOR.
JOSEPH LEDWINKA
BY
ATTORNEY.

J. LEDWINKA

DOOR FOR AUTOMOBILE BODIES

March 18, 1930.

Original Filed Jan. 12, 1926

Re. 17,623

3 Sheets-Sheet 3

INVENTOR.
JOSEPH LEDWINKA

BY J. Wm. Harbor

ATTORNEY.

Reissued Mar. 18, 1930

Re. 17,623

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

DOOR FOR AUTOMOBILE BODIES

Original No. 1,663,519, dated March 20, 1928, Serial No. 80,797, filed January 12, 1926. Application for reissue filed May 29, 1929. Serial No. 367,109.

This invention relates to doors for automobile bodies.

The object of the invention is to provide an improved door structure for automobile bodies, and particularly a door structure for bodies of the closed type, whereby to secure strength and rigidity while at the same time reducing the weight of the door.

A further object is to provide a door for automobile bodies wherein a window or glass pane may slide vertically in guides formed in the side of the door frame so as to be raised to close the upper open part thereof, or lowered into a closed pocket in the lower part of the door frame, the construction being such that a minimum depth in the sides of the door frame is employed whereby to increase to a maximum the range of vision from the interior of the automobile body.

A still further object is to provide a door for automobile bodies wherein the side rails or pillars of the door extend from top to bottom thereof, the upper and lower sections of these rails being of different cross sections, and the rails being joined together in a manner which is at once as simple as it is strong and rigid.

A still further object is the provision of a molding for the upper part of the door, which molding is in the form of an integral stamping bounding the edges of the door window opening.

A still further object is the provision in a pressed metal door of an improved mounting for a door check.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Figure 1:
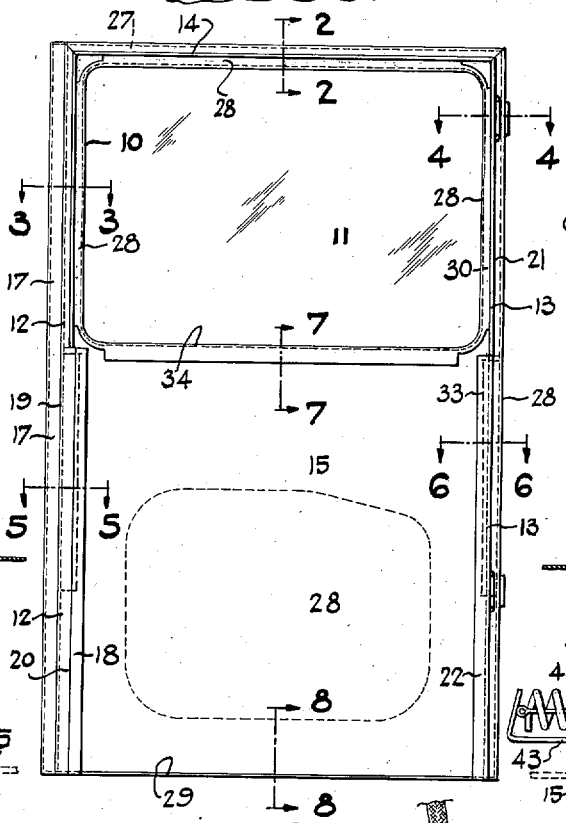

In the drawings, Fig. 1 is a view in elevation of the inner side or face of a door constructed in accordance with my invention.

Figures 2 to 8 inclusive are sections taken on the corresponding lines of Figure 1.

Figure 9:
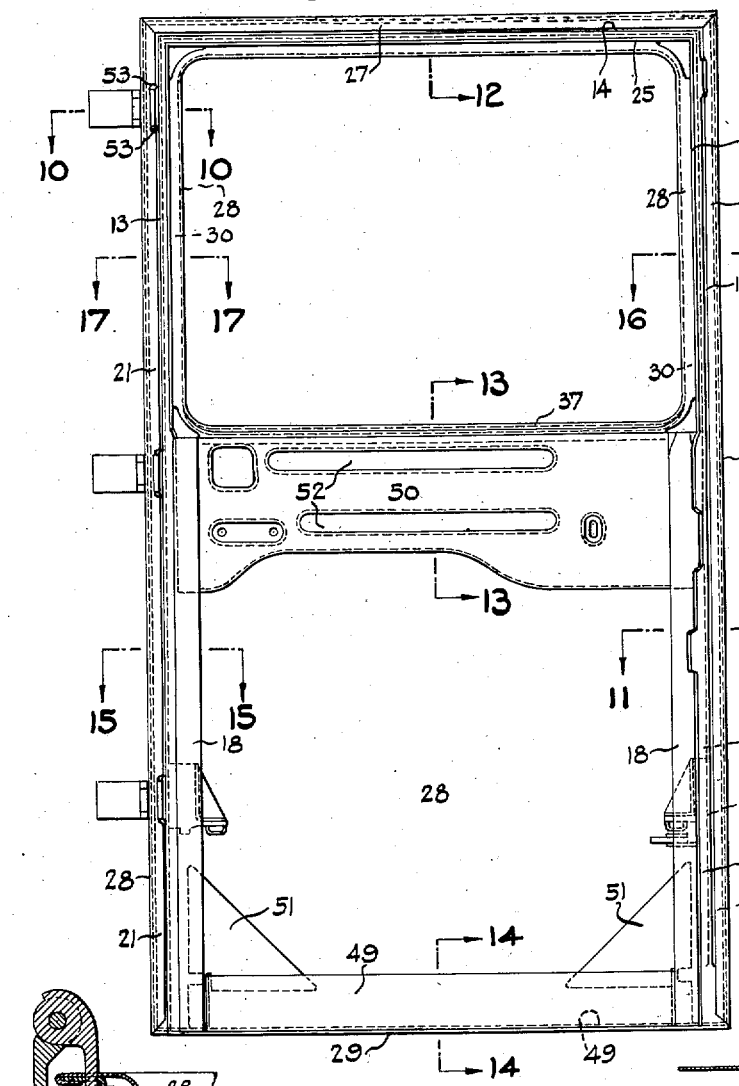
Figure 10:
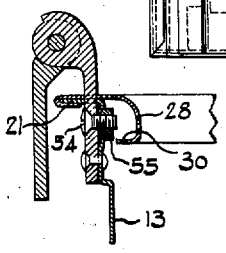
Figure 11:
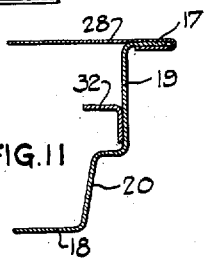
Figure 12:
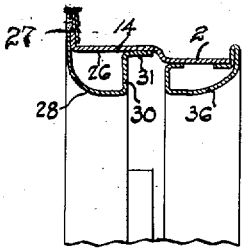
Figure 15:
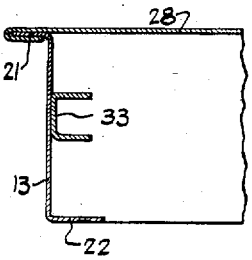

Figure 9 is a view in elevation of the inner side or face of a modified form of door construction.

Figures 10 to 17 inclusive are sections taken on the corresponding lines of Figure 9.

Figure 18:
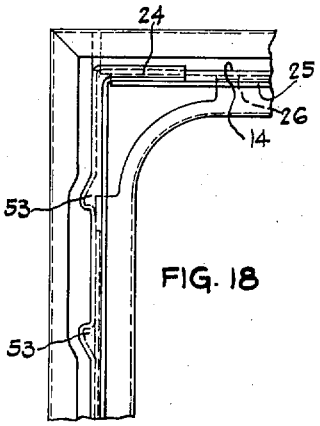
Figure 13:
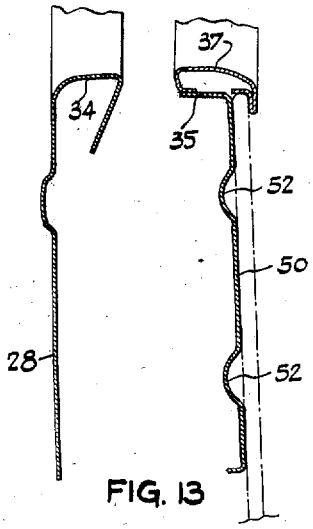
Figure 17:
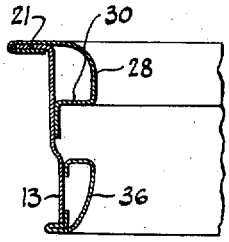
Figure 16:
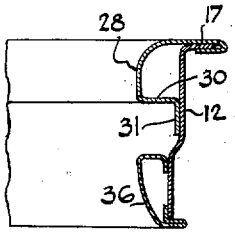
Figure 14:
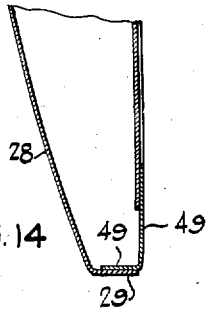

Figure 18 is an enlarged view of an upper corner of the door as shown in the circle of Figure 1.

The same reference numeral is used to designate the same parts throughout the several views.

In automobile bodies, and particularly in bodies of the closed type, it is a common practice to employ doors, the upper part of which is left open to be closed by a sliding glass pane when it is desired to close the body, this pane being lowered into a pocket in the lower part of the door when it is desired to leave the body open for ventilation or otherwise. The use of this sliding window pane has necessitated heretofore the employment of a door frame having side members furnished with tracks or guide ways on their inner surfaces for the reception of the side edges of the sliding window.

Further, the use of these sliding windows made necessary the provision of a door frame which is strong, sturdy and rigid this being especially true of the upper part of the door. This last consideration resulted, in the usual practice, in the provision of a door frame, the members of which were of considerable width and bulk. Not only did these rails of great width and bulk increase considerably the weight of the door, but they decreased very materially the degree of vision which was had from the interior of the automobile body. Especially was the maximum obtainable vision interfered with when the window guide channels were secured in place upon the interior surface of these wide and cumbersome side door rails, thus necessitating the use of a window pane of a width considerably less than the width of the upper part of the door.

My invention contemplates the provision of side rails for the door made of pressed metal stampings, the cross sections of which are such as to provide an opaque section of minimum amount, this being especially true of the upper portion of the door. My invention contemplates further the formation of glass run channels or guideways directly upon the bodies of the side rails and in addition thereto the provision of an interior molding having a depth no greater than the depth of the window guide run channels. In carrying out my invention, I propose to employ side door frame structures which, while of minimum width to assure the attainment of maximum vision, yet are of such formation and are so interconnected as to secure the desired degree of strength and rigidity for withstanding the stresses and strains to which the door is subjected when in use.

In the drawings, I have shown a door for a closed automobile body wherein the upper part 10 of the door frame is left open to receive a sliding window pane 11, this sliding window pane being adapted to be moved upwardly into the closed position, as shown in Figure 1, or downwardly into a pocket formed in the lower part of the door when the automobile body is desired to be left open. The door frame consists of side rails or pillars 12 and 13, these side rails being made of pressed metal stampings extending the full length of the door. In the door construction shown in Figure 1 the door frame is completed by a transversely-extending top rail 14 having an upwardly extending flange 27, and an inner bottom panel 15, which latter may be cut out centrally as indicated in order to reduce the weight of the door. The side rails 12 and 13 are provided at their tops with inwardly extending tabs 24 lying upon and secured to the top rail 14, as clearly shown in Fig. 18.

As shown in Figure 1, the side rail 12 constitutes the latch rail of the door while the rail 13 constitutes the hinge rail thereof. Both the latch and hinge rails are of different cross sections in their respective upper and lower portions. The latch rail 12 is formed in its upper section of substantially simple angle cross section while its lower section is of substantially double Z formation, the upper and lower sections being respectively shown in Figs. 3 and 5. Throughout its entire length the side rail 12 is provided with a forwardly-extending flange 17 while the lower portion of the rail is provided with a rearwardly-extending flange 18. Intermediate the forwardly and rearwardly-extending flanges 17 and 18 the lower section of the body of the rail is provided with the portions 19 and 20 relatively offset one from the other, thus forming a rabbet adapted to be neatly received in a similarly formed rabbet in the door post.

The hinge rail 13 differs from the latch rail 20 mainly in its lower section, this section being of substantially simple Z cross section. In a manner similar to that of the latch rail, however, the hinge rail 13 is provided with a rearwardly-extending flange 21 extending throughout the length of the door, the lower portion of this rail being provided on its inner edge with a forwardly-extending flange 22. Interconnecting the side rails 12 and 13 is the sheet metal panel or stamping 15 having its side edges underlying the flanges 18 and 22 of the side rails and secured thereto, preferably by welding. This stamping 15 is provided with a laterally-extending flange 23 along its bottom edge for a purpose presently to be described.

Figure 2:
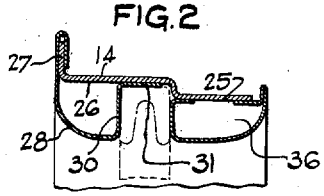
Figure 3:
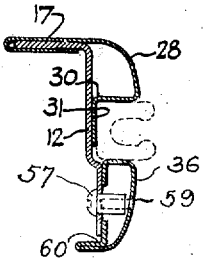
Figure 4:
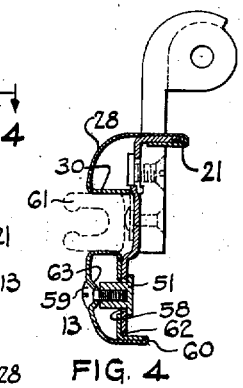
Figure 5:
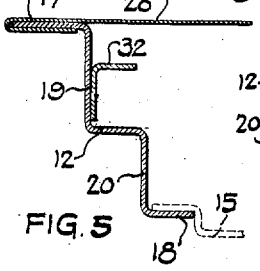

A sheet metal stamping 28, constituting the outer paneling of the door, and of an extent equal to that of the complete door, has its vertical side and upper edges clinched over the flanges 17, 21 and 27 of the door frame, while its bottom edge is provided with a laterally-extending flange 29 overlapping the flange 23 of the inner panel 15 of the door. The flanges 23 and 29 are rigidly secured together, preferably as by welding. The stamping 28 is provided in its upper portion with a window opening, the inner edges of this opening along the sides and top thereof being provided with inturned portions of substantially angular cross section, as is best shown in Figures 2, 3 and 4. The branch 30 of this inturned portion and the branch 31 thereof constitute, respectively, one wall and the base of the upper glass run channel. Corresponding to these portions 30 and 31 in the upper section of the door and in vertical alignment therewith, the lower portions of the side rails are provided, in the case of the latch rail 12, with an angle member 32, and in the case of the hinge rail 13, with a channel member 33, these constituting guide run elements in the lower portion of the door.

The panels 15 and 28, between which is formed the pocket for reception of the window glass when not in closed position, are formed at their corresponding upper edges with inturned flanges 34 and 35, the inner edges of these flanges being spaced apart to permit the passage therebetween of the sliding window.

Forming the inner walls of the glass run channel along the upper sides and top of the window opening is a retaining frame 36 in the form of a rectangularly-shaped molding adapted to fit around the edges of the window opening. This molding is formed of an integral one-piece stamping, the lower horizontal portion 37 of which serves as the finishing strip for the inturned flange 35 of the inner panel 15.

Figure 6:
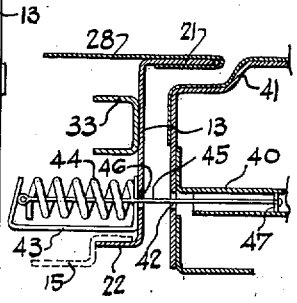
Figure 7:
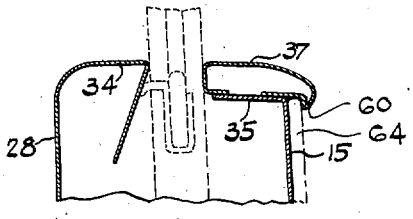
Figure 8:
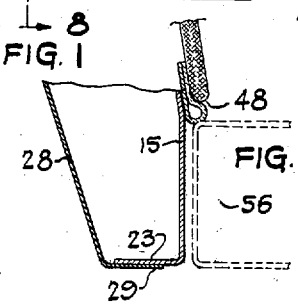

In Figure 6 is shown a door-check means for precluding an excessive opening of the door. This door-check means includes a hollow guide element 40 mounted on the interior of the door post 41, into the interior of which element communication is had through the opening 42 provided in the jamb face of the door post. Mounted in the interior of the door and to one side of the glass run channel 33 is a door-check element 43 housing a coiled compression spring 44 to one end of which is secured a flat, flexible band 45, this band 45 projecting outwardly of the door through an opening 46 provided in the side rail thereof. This opening 46 is in registry with the opening 42 in the jamb face of the door post, the flexible band 45 projecting through this opening and into the interior of the hollow member 40. Secured to the fore end of this band 45 is a head 47 arranged so as to prevent relative rotation of the band with respect to the door post and to prevent complete removal of the band therefrom. It will thus be seen that a door-check has been provided which will operate to preclude excessive opening of the door, thus preventing injury both to the door and to the hinges by which it is mounted upon the post. The coil spring 44 operates to prevent a sudden jar on the door upon being opened to its maximum extent and serves much like a shock absorber therefor.

If desired, and in order to provide an interior finish for the door, a trim or upholstery pad 48 may be secured to the exterior surface of the inner panel 15 in any desired manner.

In certain cases it may be desired to use, instead of the integral inner panel 15, a bottom rail 49 supplemented by a lock board 50 for interconnecting the side rails of the door. Such a construction is shown in Fig. 9, it being understood, however, that the upper edge of the lock board 50 and the lower edge of the bottom rail 49 correspond substantially to the upper and lower edges of the inner panel 15.

In a manner similar to that shown in Figure 1, the outer panel 28 and the bottom rail 49 are provided at their lower edges with horizontally-extending flanges adapted for overlapping engagement with each other.

In the case of both the bottom rail 49 and the lock board 50, the side edges thereof underlie and are secured, preferably by welding to the inwardly-turned flanges 18 and 22 of the latch and hinge rails, respectively. Serving as a further reinforcement at the lower corners of the door are triangularly-shaped gusset plates or brackets 51 rigidly interconnecting, preferably by means of welding the side rails and the bottom rail 49. The lock board is provided in the usual manner with longitudinally-extending reinforcing beads 52 and with depressions for the reception of the door lock operating spindle and the window-regulating mechanism.

In both the form of door shown in Figure 1, and in the modified form shown in Figure 9, the hinge rail 13 is provided in the vicinity of the hinges with pairs of projections or beads 53 (as best shown in Fig. 18) extending transversely of the body of the rail, each pair being adapted to embrace one of the hinge elements. These projections serve as a means for maintaining in place against lateral displacement these several hinge elements, which hinge elements are secured to the hinge rail by means of screws 54 in threaded engagement with clinch nuts 55 provided in the hinge rails, as is most clearly shown in Figure 10.

By virture of the particular arrangements of the framework elements, including the transversely-extending panel 15 and the bottom rail 49, an automobile door has been devised which abuts against the body side sill member 56, the bottom line of the door lying substantially in the plane of the bottom edge of the side sill. As is clearly shown in Figure 8, this construction lends a decidedly improved appearance to the outside finish of the car, there being but one horizontal line at the bottom thereof extending from front to rear.

The retaining frame 36 is slipped in bodily from the inside face of the door. The securing means for holding it in place is illustrated in Figures 3 and 4. There are provided both in connection with the side rails and the top rails as many of these securing devices as may be found desirable to effectively keep the frame in place. They consist of a flanged nut 57, the body of which is projected through an aperture 58 in the door rail somewhat larger than the body of the nut, from the outside of the rail interiorly. A bevel-headed screw 59 engaging in a countersunk hole 63 in the frame is screwed into the nut. The enlargement of the opening 58 over the diameter of the nut 57 is such, and the relation of the flange 60 of the molding in position to the screw 59, are such as to permit a sufficient adjustment of the frame toward and from the glass as to insure proper pressure of the frame upon the felts 61 in the glass run channel. There is thus a small clearance 62 between the edge of the door rail and the flanges 60. Still further, the length of the screw 59 and the length of the nut are so adjusted that the end of the screw strikes the bottom of the nut, and the molding strikes the top of the nut before pressure of the screw 59 shall have unduly distorted the face of the molding. A clearance of a bare fraction of an inch such as a 64th or thereabouts when the head 59 of the screw first engages the seat 63 is amply sufficient for this purpose.

The lower branch 37 of the molding has its outturned flange 60 spaced away from the face of the inner paneling whereby the door upholstery 64 may be held in place beneath it at its upper edge.

A door structure such as described above avoids the objections and secures the advantages and benefits above described. It is not only light in weight, but it is strong, rigid and sturdy, and capable of withstanding the stresses, strains, shocks and jars of usage and of still greater importance, the side frame structure for the upper open part of the door is extremely narrow, hence affording a maximum range of vision to the occupants of the car.

Having set forth the objects of my invention and a structure embodying the principles thereof, I wish it to be understood that many changes in these specific details of the structure might readily occur to persons skilled in the art, and still fall within the scope and spirit of my invention.

What I claim is:

1. In a pressed metal automobile door, in combination, a pair of pressed metal side rails, inwardly-extending integral tabs at the tops of said side rails, and a top rail having its ends seated under and secured to said inwardly-extending tabs.

2. In a vehicle door construction, a pressed metal side rail having a transversely extending portion of web cross section formed with a pair of transversely extending pressed out projections adapted to receive between them a hinge element and prevent displacement thereof longitudinally of the rail.

3. A rail for doors of closed vehicle bodies comprising a pressed metal member extending the length of the door and having a transverse web portion forming the jamb face of the door, said web portion being offset intermediate its edges, the offset being substantially less than in its upper portion at the side of the window opening than in the lower portion.

4. A rail for doors of closed vehicle bodies comprising in the region of the window opening a main transversely extending portion of web cross section forming the jamb face of the door, and an outer door overlap flange, the main transversely extending portion being offset toward the central transverse plane of the door at its inner portion, a panel strip clinched around the overlap flange and extending inwardly of the door in bowed relation and then flanged, first toward the transversely extending web portion and then laterally and secured to said web portion outwardly of said offset therein, and a window retaining strip seated on the inner offset portion of the transversely extending web portion and secured thereto.

5. A rail for doors of closed vehicle bodies comprising in the region of the window opening a main transversely extending portion of web cross section forming the jamb face of the door and offset toward the central transverse plane of the door in its inner portion, a panel strip having an edge flange secured to the transversely extending web portion outwardly of said offset, and forming the bottom of the glass run, a window retaining strip seated on the inner face of the offset portion of the transversely evtending web portion and having a laterally extending reversely bent portion overlapping the inner edge of said web portion, said reversely bent portion being of a depth substantially equal to the offset in the main transversely extending portion of the rail.

6. A door comprising a sheet metal face member provided with a window opening and sheet metal side members provided with outwardly extending marginal flanges secured to the margin of said face member, the inner edge of said side members in the region of the opening being disposed in a plane perpendicular to the plane of said face member and below said window opening in a plane parallel to the plane of said face member, and a lock board extending transversely of said door below said window opening and secured to the last mentioned flanges.

7. A door having a unitary sheet metal face member provided with a window opening therein, sheet metal edge members secured perpendicularly to the margin of said face member, the metal of said face member defining the side edges of said opening being bent away from the plane of said face member and then outwardly in the plane of said opening to form a window guiding channel abutment, and a window guiding channel receiving socket secured to the side edge members below said opening and in line with said abutment.

8. A rail for doors of closed vehicle bodies comprising in the region of the window opening a main transversely extending portion of web cross section forming a jamb face of the door, and an outer door overlap flange, the main transversely extending portion being offset toward the central transverse plane of the door at its inner portion, a panel strip clinched around the overlap flange and extending inwardly of the door in bowed relation and then flanged, first toward the transversely extending web portion and then laterally and secured to said web portion, and a window retaining strip seated on the inner offset portion of the transversely extending web portion and detachably secured thereto.

9. An automobile door construction comprising a metal side rail having a transversely extending body portion of web cross section and extending the full length of the door, a panel strip stamping secured at its one edge along an edge of said body portion and at its opposite edge intermediate the edges of said body portion, and a molding member secured to said body portion in spaced relation to said panel strip, said panel strip and molding forming a glass receiving channel.

JOSEPH LEDWINKA.